(12) United States Patent
Yamada et al.

(10) Patent No.: US 6,285,123 B1
(45) Date of Patent: Sep. 4, 2001

(54) ELECTRON EMISSION DEVICE WITH SPECIFIC ISLAND-LIKE REGIONS

(75) Inventors: Takashi Yamada; Atsushi Yoshizawa; Takuya Hata; Shingo Iwasaki; Nobuyasu Negishi; Takashi Chuman; Hideo Satoh; Hiroshi Ito; Takamasa Yoshikawa; Kiyohide Ogasawara, all of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/393,806

(22) Filed: Sep. 10, 1999

(30) Foreign Application Priority Data

Sep. 11, 1998 (JP) .................................................. 10-258087

(51) Int. Cl.$^7$ ......................................................... H01J 1/62
(52) U.S. Cl. .............................................. 313/495; 313/496
(58) Field of Search .................................... 313/495, 496, 313/497, 631

Primary Examiner—Vip Patel
(74) Attorney, Agent, or Firm—Sughrue, Mion, Zinn, Macpeak & Seas, PLLC

(57) ABSTRACT

An electron emission device includes an electron-supply layer formed of metal or semiconductor; an insulator layer formed on the electron-supply layer; and a thin-film metal electrode formed on the insulator layer, whereby electrons are emitted when an electric field is applied between the electron-supply layer and the thin-film metal electrode. The insulator layer and the thin-film metal electrode have at least one island-like region where the thicknesses of the insulator layer and the thin-film metal electrode gradually decrease.

27 Claims, 9 Drawing Sheets

ELECTRON EMISSION DEVICE WITH SPECIFIC ISLAND-LIKE REGIONS

BACKGROUND OF THE INVENTION

1. Field of the Invention

The present invention relates generally to an electron emission device, and more particularly to an electron emission display device which has a plurality of electron emission devices arranged in an image display array, for example, in a matrix form.

2. Description of the Related Art

Conventionally, in field electron emission display apparatuses, a Field Emission Display (FED) is known as a planar emission display device equipped with an array of cold cathode electron emission sources which does not require cathode heating. The emission principle of, for example, an FED using Spindt-type cold cathodes of minute protrusions is as follows. Its emission principle is like a Cathode Ray Tube (CRT), although this FED has a cathode array of Spindt-type protrusions which is different from that of CRT. In the FED, electrons are drawn into a vacuum space by means of each gate electrode spaced apart from the Spindt-type cathode, and the electrons are made to impinge upon the fluorescent substance that is coated on a transparent anode, thereby causing light emission.

This FED, however, has a problem of low production yield because the manufacture of the minute Spindt-type emitter arrays as a cold cathode is complex and involves many processes.

There is also known an electron emission device with electron emission devices of metal-insulator-metal (MIM) structure as a planar electron emission source. The electron emission device with the MIM structure comprises an Al underlayer as a base electrode, an $Al_2O_3$ insulator layer with about 10 nm thickness, and a Au overlayer, as a top electrode with about 10 nm thickness which are formed in order on the substrate. In the case that this MIM device is placed under an opposing electrode in a vacuum, when a voltage is applied between the Al underlayer and the Au overlayer and, at the same time, an acceleration voltage is applied to the opposing electrode, then some of electrons emit out of the Au overlayer and reach the opposing electrode.

However, even the electron emission device with the MIM structure does not yet provide a sufficient amount of emitted electrons.

To overcome these disadvantages of emission of the MIM device, it is conventionally considered that there is a necessity to make the $Al_2O_3$ insulator layer thinner by about several nanometers and make the $Al_2O_3$ insulator layer with a uniform quality so that the interface between the $Al_2O_3$ insulator layer and the Au overlayer is more uniform.

To provide a thinner and more uniform insulator layer, for example, an attempt has been made to control the anodized current by using an anodization method thereby to improve the electron emission characteristics, as in the invention described in Japanese Patent Application kokai No. Hei 7-65710.

However, even an electron emission device with the MIM structure which is manufactured by this anodization method ensures an emission current of about $1 \times 10^{-5}$ A/cm$^2$ and an electron emission efficiency of about 0.1%.

The MIM type electron emission device whose insulator layer has a thickness of several tens of nanometers to several micrometers does not have a plane forming status formed uniformly resulting in a problem of bringing an unstable electron emission property of the device.

A surface conductive type electron emission device is further known. This type device is manufactured as follows. First a pair of facing electrodes are formed on a substrate of an insulative material. Subsequently a conductive thin film is bridged between the facing electrodes. The conductive thin film bridge is electrified as an electrifying process so as to form a gap or break as an electron emission portion therein. Since such a gap or break is generated by locally destroying, denaturing or modifying the conductive thin film, there are problems in that the structural homogeneity in the electron emission portion is inferior and, the re-productivity in shape of the electron emission portion is very poor. The electron emission portion is restricted in shape within a linear line.

OBJECT AND SUMMARY OF THE INVENTION

The present invention has been made in view of the above circumstances, and thus an object thereof is to provide an electron emission device having an electron emitting efficiency high enough to stably emit electrons at a low voltage applied thereto, and moreover a display apparatus including a flat panel display device which employs a plurality of such electron emission devices.

To attain the above object, the present invention provides an electron emission device which comprises:

an electron-supply layer made of a semiconductor material, a metal compound or metal;

an insulator layer formed on the electron-supply layer; and a thin-film metal electrode formed on the insulator layer, characterized in that the insulator layer and the thin-film metal have a plurality of island-like regions where thicknesses of both the insulator layer and the thin-film metal electrode gradually decrease.

According to the electron emission device having the structure mentioned above, said island-like regions are electron emission sites.

According to the electron emission device having the structure mentioned above, said insulator layer is made of dielectric and has a film thickness of 50 nm or greater.

According to the electron emission device having the structure mentioned above, the thin-film metal electrode is terminated on the insulator layer in each of the island-like regions.

According to the electron emission device having the structure mentioned above, the insulator layer is terminated on the electron-supply layer in each of the island-like regions.

According to the electron emission device having the structure mentioned above, each of the island-like regions is a recess formed in a flat surface of the thin-film metal electrode.

According to the electron emission device having the structure mentioned above, the insulator layer and the thin-film metal are formed by a physical vapor deposition and/or chemical vapor deposition.

According to the electron emission device having the structure mentioned above, a minute particle is provided in each of the island-like regions.

According to the electron emission device having the structure mentioned above, an inverse tapered block is provided in each of the island-like regions.

According to one aspect of the present invention, there is also provided a method of manufacturing an electron emission device having a plurality of island-like regions where thicknesses of an insulator layer and a thin-film metal electrode gradually decrease, which method comprises the steps of:

forming an electron-supply layer on a substrate;

spraying a plurality of minute particles onto the electron-supply layer;

depositing an insulator material on the electron-supply layer and the minute particles, thereby forming a thin insulator layer; and forming a thin-film metal electrode on the insulator layer and the minute particles, thereby forming island-like regions around a contact surface under the minute particles.

In an embodiment according to the invention of the method of manufacturing an electron emission device, the method further comprises a step of applying a voltage across the electron-supply layer and the thin-film metal electrode for growth of conductive paths after the thin-metal electrode forming step.

In an embodiment according to the invention of the method of manufacturing an electron emission device, the method further comprises a step of removing the minute particles from the island-like regions after the thin-metal electrode forming step.

In an embodiment according to the invention of the method of manufacturing an electron emission device, the method further comprises a step of applying a voltage across the electron-supply layer and the thin-film metal electrode for growth of conductive paths after the minute particle removing step.

According to another aspect of this invention, there is further provided a method of manufacturing an electron emission device having a plurality of island-like regions where thicknesses of an insulator layer and a thin-film metal electrode gradually decrease, which method comprises the steps of:

forming an electron-supply layer on a substrate;

forming electrically insulative inverse tapered blocks each protruding in a direction normal to the substrate and each having an overhang portion, at an upper portion thereof, protruding in a direction parallel to the substrate;

depositing an insulator on the electron-supply layer, thereby forming a thin insulator layer; and forming a thin-film metal electrode on the insulator layer, thereby forming island-like regions around a contact surface under the inverse tapered blocks.

In an embodiment according to the invention of the method of manufacturing an electron emission device, the method further comprises a step of applying a voltage across the electron-supply layer and the thin-film metal electrode for growth of conductive paths after the thin-metal electrode forming step.

In an embodiment according to the invention of the method of manufacturing an electron emission device, the method further comprises a lift-off step of removing the inverse tapered blocks from the island-like regions after the thin-metal electrode forming step.

In an embodiment according to the invention of the method of manufacturing an electron emission device, the method further comprises a step of applying a voltage across the electron-supply layer and the thin-film metal electrode for growth of conductive paths after the lift-off step.

In an embodiment according to the invention of the method of manufacturing an electron emission device, said block forming step includes steps of forming an inverse tapered block material layer on said substrate, forming a resist mask on said inverse tapered block material layer by photolithography for exposing part of at least said electron-supply layer, and carving said inverse tapered blocks having said overhang portions by dry etching or wet etching.

The present invention still further provides an electron emission display device which comprises:

a pair of a first substrate and an optically transparent second substrate opposing to each other with a vacuum space interposed therebetween;

a plurality of electron emission devices formed on said first substrate, each of which including an electron-supply layer made of a semiconductor material, a metal compound or metal formed on ohmic electrodes formed on said first substrate, an insulator layer formed on said electron-supply layer, and a thin-film metal electrode formed on said insulator layer and facing the vacuum space, wherein the insulator layer and the thin-film metal have a plurality of island-like regions where thicknesses of both the insulator layer and the thin-film metal electrode gradually decrease;

a collector electrode formed on said second substrate; and a fluorescent material layer formed on said collector electrode and facing the vacuum space.

In the electron emission display device according to the invention, said insulator layer is made of dielectric and has a film thickness of 50 nm or greater.

In the electron emission display device according to the invention, the thin-film metal electrode is terminated on the insulator layer in each of the island-like regions.

According to the electron emission display device having the structure mentioned above, the insulator layer is terminated on the electron-supply layer in each of the island-like regions.

According to the electron emission display device having the structure mentioned above, each of the island-like regions is a recess formed in a flat surface of the thin-film metal electrode.

According to the electron emission display device having the structure mentioned above, the insulator layer and the thin-film metal are formed by a physical vapor deposition and/or chemical vapor deposition.

In the electron emission display device according to the invention, the display device further comprises plural insulative support members formed on said first substrate and disposed between adjacent ones of said electron emission devices so as to enclose the electron emission devices for partitioning them, wherein the distance from said first substrate to the surfaces of said insulative support members proximate to said vacuum space is substantially equal to the distance from said first substrate to the surface of said thin-film metal electrodes proximate to said vacuum space.

In the electron emission display device according to the invention, the display device further comprises a plurality of bus electrodes, each of which is arranged in a stripe form to electrically connect adjacent ones of said thin-film metal electrodes, wherein said ohmic electrodes and said electrodes are stripe-like electrodes and arranged to extend perpendicular to each other.

In the electron emission display device according to the invention, said first substrate includes a plurality of first insulative ramparts, each of which disposed between said electron emission devices and protruding into said vacuum space, whereas said second substrate includes a plurality of second ramparts each of which protrudes into said vacuum space to abut to said first ramparts.

According to the electron emission device of the invention with the above structure, since the thicknesses of island-like portions of the insulator layer and the thin-film metal electrode gradually decrease in a direction along which their interface extends, the amount of electrons increases that are emitted from the island-like regions.

Moreover, through-bores are not likely to be produced in the insulator layer because of its relatively thick thickness and therefore its production yield is improved. The electron emission device of the invention is a planar or spot-like electron emission diode and can be adapted to high speed devices such as a source of a pixel vacuum tube or bulb, an electron emission source of a scanning or transmission electron microscope, a vacuum-micro electronics device and the like. In addition, this electron emission device can serve as a minute microwave tube or a diode which emits electromagnetic waves with millimeter or sub-millimeter wavelength, and also can serve as a high speed switching device.

DETAILED DESCRIPTION OF THE PREFERRED EMBODIMENTS

An electron emission device according to an embodiment of the present invention will be described in more detail with reference to the accompanying drawings.

Figure 1:
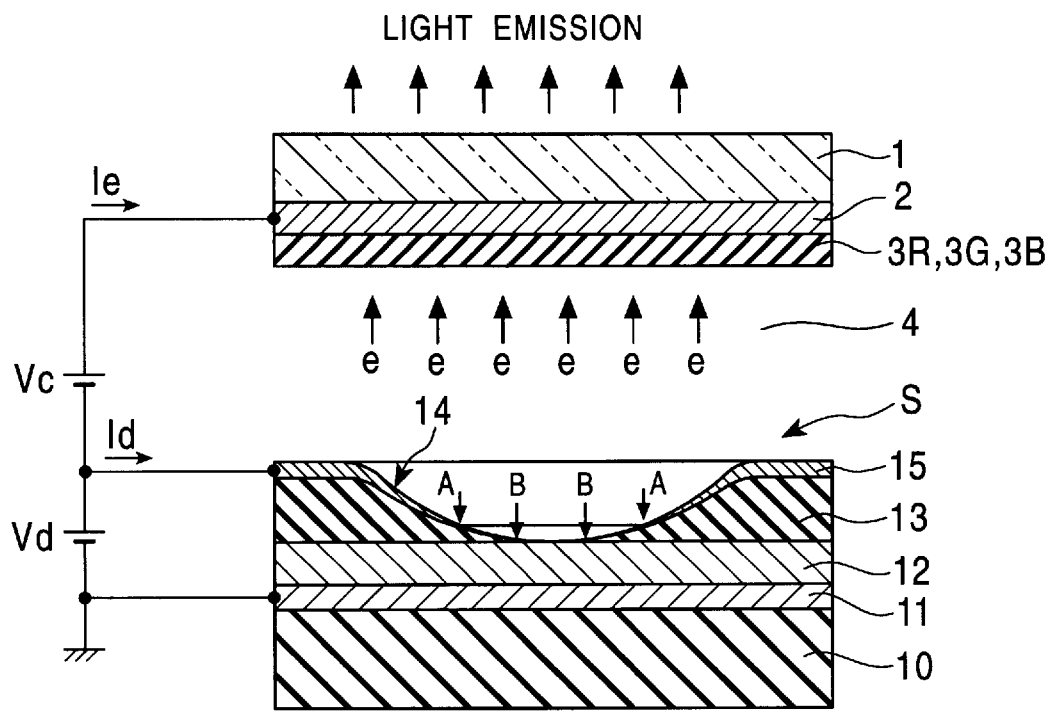
FIG. 1 is a schematic cross-sectional view of an electron emission device according to an embodiment of the present invention.

As illustrated in FIG. 1, one electron emission device "S" constructed in a stack configuration comprises; an ohmic electrode 11 made of aluminum (Al), tungsten (W), titanium nitride (TiN), copper (Cu), chromium (Cr) or the like on a first substrate 10 made of a glass or the like; an electron-supply layer 12 made of a semiconductor material such as silicon (Si) or a metal compound or metal on the ohmic electrode 11; an insulator layer 13 made of dielectric such as $SiO_x$ (X=0.1 to 2.0) or the like on the electron-supply layer 12; and a thin-film metal electrode 15 made of metal such as platinum (Pt), gold (Au) or the like facing a vacuum space on the insulator layer 13. Particularly, the insulator layer 13 is deposited in considerably thicker thicknesses so as to have a thickness of 50 nm or greater. These layer are formed through the sputtering method by using a gas of Ar, Kr or Xe or a mixture thereof, or a gas mixture essentially consisting of one of those rare gases with $O_2$, $N_2$ or the like mixed therein, under the sputtering conditions of a gas pressure of 0.1 to 100 mTorr, preferably 0.1 to 20 mTorr and the forming rate of 0.1 to 1000 nm/min, preferably 0.5 to 100 nm/min.

Formed on the insulator layer 13 and the thin-film metal electrode 15 are plural island-like regions 14 where the thicknesses of the insulator layer 13 and the thin-film metal electrode 15 gradually decreases toward the center of island-like regions.

As shown in FIG. 1, each island-like region 14 is formed as a recess on the flat surface of the thin-film metal electrode 15. In each island-like region 14, the thin-film metal electrode 15 ends at an edge "A" on the insulator layer 13. The insulator layer 13 in each island-like region 14 ends at an edge "B" on the electron-supply layer 12.

Figure 2:
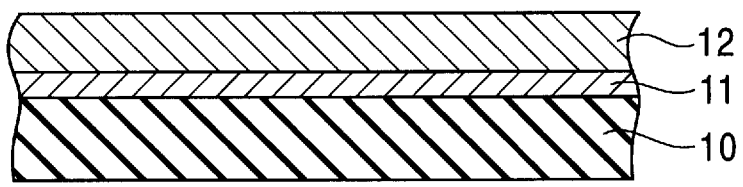
FIGS. 2 through 5 are enlarged cross-sectional views each illustrating a part of a device substrate in one method of manufacturing an electron emission device according to the present invention respectively.

The plural island-like regions 14 as recesses are formed in the following manner. First, the electron-supply layer 12 is formed by sputtering on the substrate 10 on which the ohmic electrode 11 is formed, as shown in FIG. 2.

Figure 3:
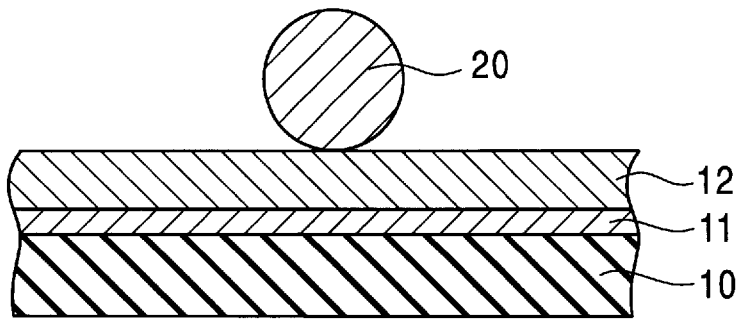

Then, a plurality of spherical minute particles 20 are sprayed on the electron-supply layer 12 as shown in FIG. 3 but showing only one minute particle. The minute particles need not be spherical to ensure electron emission. However, spherical particles with an isotropic shape such as spacers used for a liquid crystal display panel, ball mills or the like are desirable in consideration of the uniformity of the grain boundary portions of the minute particles, uniform dispersion on a film and no flocculation. A variation in the distribution of particle sizes should be small. The available materials for the minute particles are an insulator, semiconductor and metal. When metal minute particles are to be used in which case the device may be short-circuited, the minute particles should be removed after the thin-film metal electrode 15 is formed.

Figure 4:
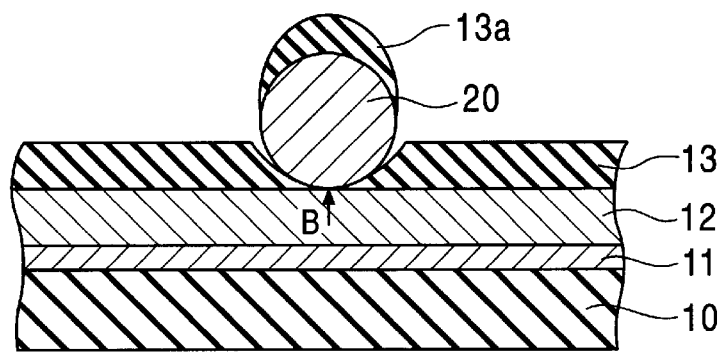

Subsequently, as shown in FIG. 4, an insulator 13, 13a is deposited on the electron-supply layer 12 and the minute particles 20, thus forming the insulator layer 13 which is a thin film of the insulator. At this point, the insulator gas comes around the portion where the electron-supply layer 12 contacts each minute particle 20, thus forming an insulator layer portion whose thickness gradually decreases from the predetermined thickness of the insulator layer 13. This insulator layer portion ends at the edge "B" on the electron-supply layer 12 in each island-like region 14.

Figure 5:
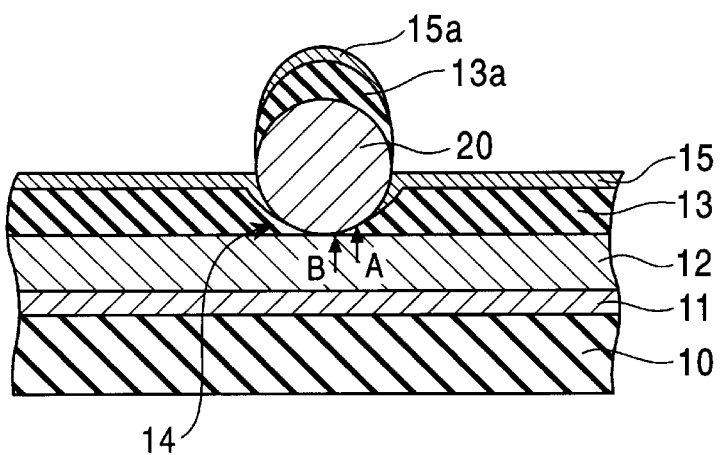

Next, metal layers 15, 15a are deposited on the insulator layer 13 and the minute particles 20, thus forming the thin-film metal electrode 15, as shown in FIG. 5. At this point, the metal gas comes around the portion where the electron-supply layer 12 contacts each minute particle 20 from a clearance between the insulator layer 13 and that minute particle 20, thus forming a thin-film metal electrode portion whose thickness gradually decreases from the predetermined thickness of the thin-film metal electrode 15. This thin-film metal electrode portion ends at the edge "A" on the insulator layer 13 in each island-like region 14. In other words, there is a boundary (grain boundary) between each minute particle 20 and the insulator layer 13 or the thin-film metal electrode 15 and the insulator layer 13 and the thin-film metal electrode 15 continuously and gradually become thinner toward the contact point between that minute particle and the electron-supply layer 12 from that boundary. In the above manner, the island-like regions 14 as recesses are formed around the contact surfaces under the minute particles 20 in the insulator layer 13 and the thin-film metal electrode 15.

After this thin-metal electrode forming step, the dent recessed island-like regions 14 shown in FIG. 1 are formed by removing the minute particles by implementing an ultrasonic cleaning or the like.

Note that the electron emission device may have the minute particles un-removed. The diameter of the minute particles is set to such a size that part of each minute particle comes out of the surface of the thin-film metal electrode on the electron emission side, i.e., each minute particle is not completely buried. When the insulator layer becomes too thick to confirm the existence of the minute particles from outside, the emission current gets lower.

After this minute particle removing step or alternatively the thin-metal electrode forming step, a conductive path growth step may be performed for the substrate 10 carrying electron emission devices each having the island-like region 14 the thin-film metal electrode 15 terminated on the portion of the insulator layer 13 whose thickness gradually decrease, regardless of whether or not the minute particles has been on the device. A pertinent voltage is applied across the electron-supply layer 12 and the thin-film metal electrode 15 to flow a given current therebetween in the conductive path growth step. Although the insulator portion between the edge "B" of the insulator layer 13 and the edge "A" of the thin-film metal electrode 15 have a high resistivity, this portion become a current path for an electron emission site. Therefore the electric current first flows at this insulator portion of the electron emission site. Thus Joule's heat occurs, so that the growth of the conductive paths is facilitated in the surface or inside of the insulator portion within the electron emission site.

Subsequently the Si portion of the electron-supply layer 12 just on and beneath the electron emission site of the insulator portion obtains a low electric resistance locally and selectively reduced, although the Si material has exhibited a high resistivity at the beginning, resulting in the increase of quantity of current. In this way, the conductive paths grow concentratedly and uniformly within each island-like region 14. In addition, the conductive path growth step prevents unwanted insulator breakdown because of the high resistivity of Si at the beginning, and contributes to a stable emission current of the resultant device.

Figure 6:
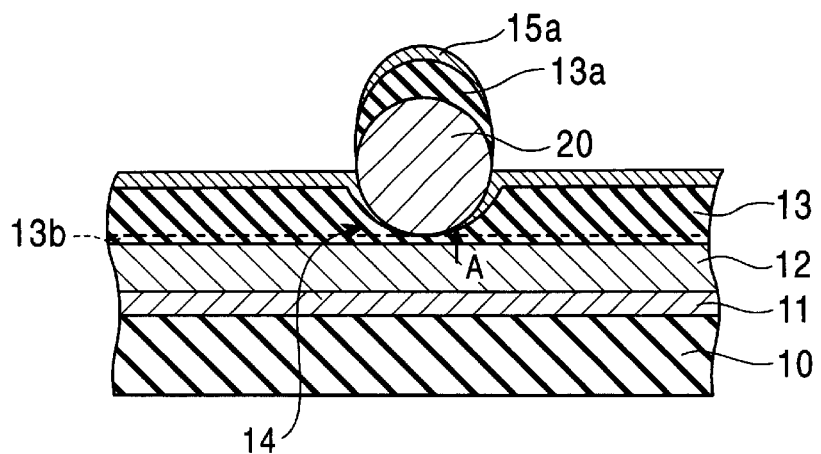
FIG. 6 is an enlarged cross-sectional view of a part of a device substrate in another manufacture method for an electron emission device according to the present invention.

Although the minute particles 20 are in contact with the electron-supply layer 12 in this embodiment, an auxiliary insulator layer 13b may be formed by sputtering immediately before the minute-particles spraying step so that the minute particles 20 are separated from the electron-supply layer 12 through this auxiliary insulator layer 13b, as shown in FIG. 6. The separated distance should be in a range of several tens of angstroms to several thousand angstroms. This design can prevent short-circuiting between the electron-supply layer 12 and the thin-film metal electrode 15.

Figure 7:
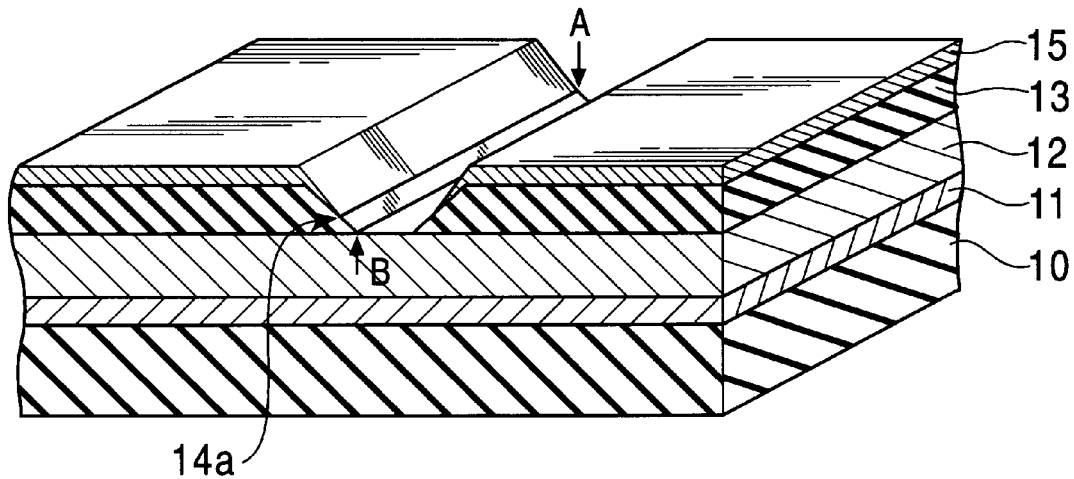
FIGS. 7 through 10 are enlarged perspective views each illustrating a part of another electron emission device according to the present invention respectively.
Figure 8:
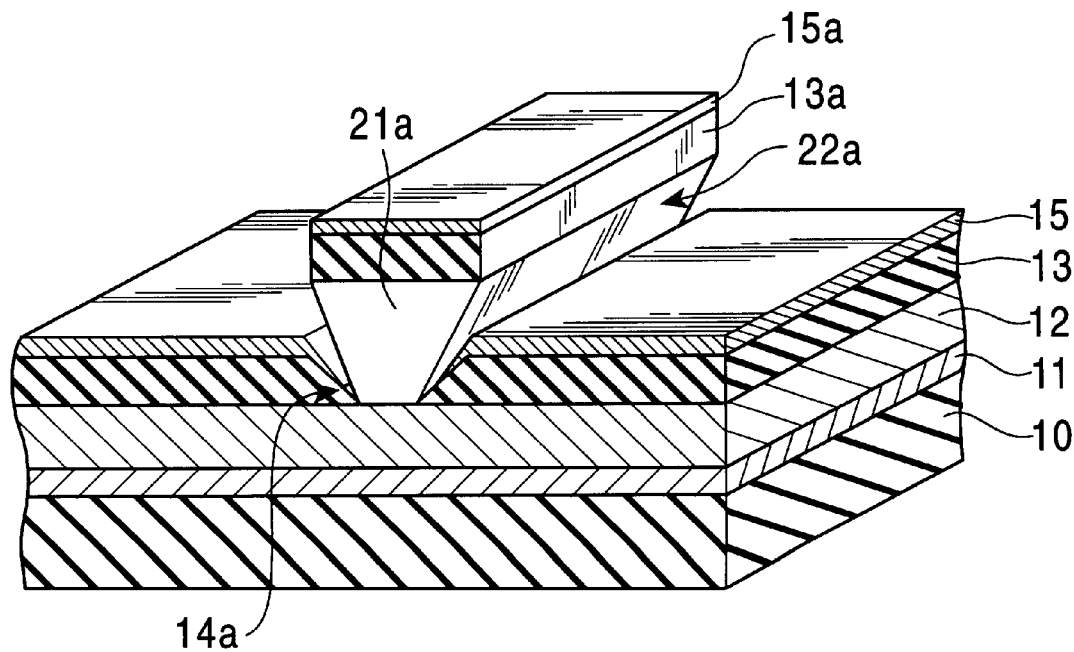
Figure 9:
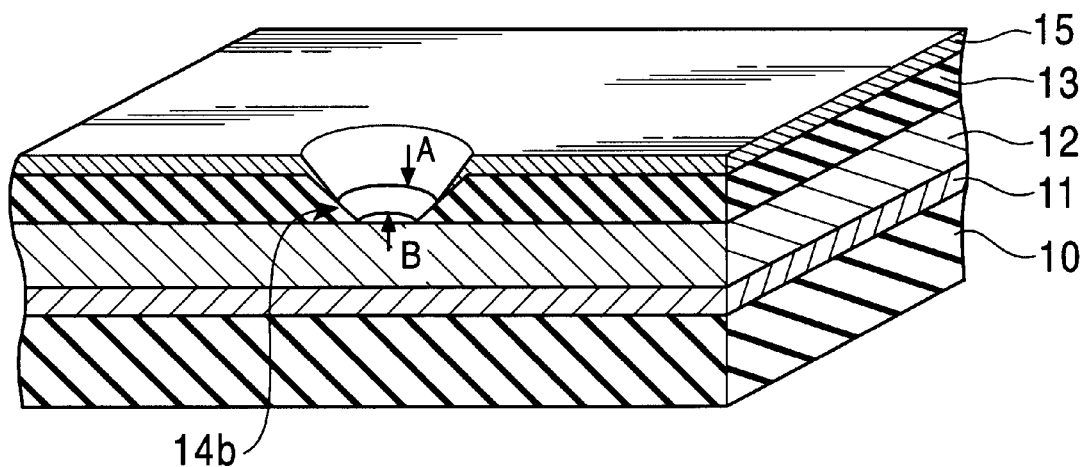
Figure 10:
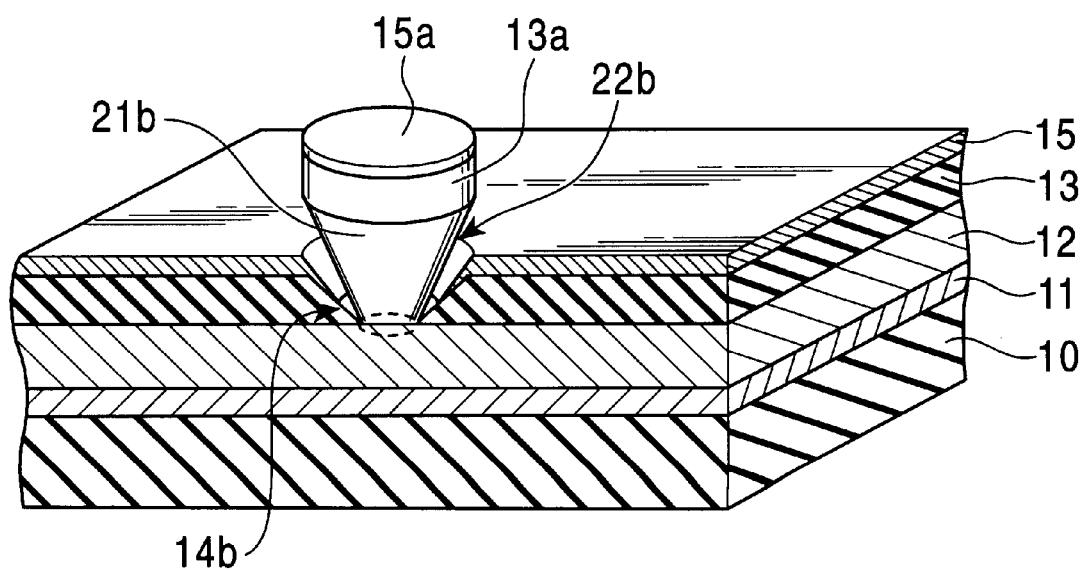

The island-like regions 14 are not limited to crater-like recesses formed by the minute particles, but may take the shape of groove-shaped recesses 14a as shown in FIG. 7 or the shape of cone-like recesses 14b as shown in FIG. 9. The shape of the island-like regions and a method of forming the island-like regions are optional. The groove-shaped recesses 14a and the cone-like recesses 14b in examples illustrated in FIGS. 7 and 9 are formed in the same procedures as are used to form the island-like regions 14 above mentioned, except that the minute particles are replaced with line- or dot-shaped inverse tapered blocks 21a as shown in FIG. 8 or columnar inverse tapered blocks 21b as shown in FIG. 10. The electron emission device may have the inverse tapered blocks 21a or 21b on the electron-supply layer 12 or the auxiliary insulator layer 13b as shown in FIG. 6. Each inverse tapered block 21a or 21b is formed of an electrically insulative material like a resist, protrudes in a direction normal to the substrate 10 and has an overhang portion 22a or 22b at its upper portion, which protrudes in a direction parallel to the substrate. After forming the thin-metal electrode 15, a lift-off step is performed for removing the inverse tapered blocks 21a, 21b from the island-like regions so as to form the recessed island-like regions.

As apparent from the above, the electron emission device has a plurality of island-like regions 14 as recesses formed uniformly on the top surface by removing the minute particles 20 or the inverse tapered blocks 21a or 21b as shown in FIG. 1, 7 or 9. The electron emission device may have the minute particles 20 or the inverse tapered blocks 21a or 21b left in the centers of the recessed island-like regions 14 as shown in FIGS. 5 and 6, or FIG. 8 or 10.

In case that the first substrate 10 carrying plural electron emission devices i.e., device substrate or back substrate is used for a display device, a second substrate i.e., front substrate 1 made of glass and the substrate 10 are supported apart from one another in parallel by a spacer and sealed to face each other with a vacuum space 4 interposed therebetween. On the inner surface of the front substrate 1, at lest one transparent collector electrode 2 of, for example, an indium tin oxide (so-called ITO), tin oxide (SnO), zinc oxide (ZnO) or the like, is formed. The transparent collector electrode traps emitted electrons. The transparent collector electrodes may be arranged in groups of three in association with red (R), green (G) and blue (B) color signals in order to provide a color display panel, and voltages are applied to those three collector electrodes respectively. The transparent collector electrodes are separately coated with fluorescent materials 3R, G, B which are capable of emitting lights of R, G and B corresponding to the three primary colors of light respectively. A black stripe masks BM or back metal layer may be provided on the front substrate 1 between the fluorescent material layers 3R, G, B. Alternatively the collector electrode 2 may be formed integrally as a monolithic film for a monochrome display panel. The material for the back substrate 10 is not limited to glass, and ceramics such as $Al_2O_3$, $Si_3N_4$ and BN etc. may be used instead of glass.

This electron emission device "S" can be regarded as a diode of which the thin-film metal electrode 15 at its surface is connected to a positive applied voltage Vd and the ohmic electrode 11 is connected to a ground potential as shown in FIG. 1. When the voltage Vd for example approximately 90 volt is applied between the ohmic electrode 11 and the thin-film metal electrode 15 to supply electrons into the electron-supply layer 12, a diode current Id flows. Since the insulator layer 13 has a high resistance, most of the applied electric field is applied and concentrated to the insulator layer 13. The electrons travel in the insulator layer 13 toward the thin-film metal electrode 15 in each island-like region 14. Some of the electrons that reach near the thin-film metal electrode 15 pass through the island-like region 14, due to the strong electric field, to be emitted out into the vacuum space.

The electrons "e" (emission current Ie) discharged from the island-like region 14 are soon accelerated by a high voltage Vc for example approximately 5 kilovolt which is applied to an opposing collector electrode 2 (transparent electrode), and are collected with the collector electrode 2. When a fluorescent substance 3 is coated on the collector electrode 2, corresponding visible light is observed.

Generally speaking, an MIM or MIS type electron emission device whose insulator layer has a thickness of several tens of nanometers to several micrometers cannot emit electrons immediately after the simple production of the device. To ensure the electron emission, the electron emission device as produced requires a process called "forming" which applies a voltage between the thin-film metal electrode 15 and the ohmic electrode 11 in such a way that the former electrode 15 becomes positive. Unlike the so-called dielectric breakdown, the "forming" process has not been clearly explained yet while there are various opinions about this matter, such as diffusion of an electrode material into the insulator layer, crystallization in the insulator layer, growth of the conductive path called "filament" and stoichiometric deviation in the composition of the insulator. This "forming" process suffers an extremely poor controllability, which makes it difficult to manufacture electron emission devices with high reliability and reproducibility. As "forming sites" grow accidentally in the electrode surface, it is not possible to specify the origins of electron emission (electron emission sources). That is, since the sources of electron emission cannot be formed uniformly in the device surface, uniformity of the electron emission pattern becomes extremely poor.

For the electron emission device of this embodiment, there are provided a local portion of the insulator layer 13 which gradually become thinner i.e., the island-like regions 14 whose thicknesses of 13, 15 also gradually decrease, in each of which an electron emission site is formed in such a manner that the edge of the thin-film metal electrode 15 is placed on the insulator layer 13 gradually becoming thinner. This electron emission device is capable of emitting electrons sufficiently. In addition to the above process, there may carry out the so-called conductive path growth step above mentioned. By the conductive path growth step, the conductive minute structure existing in the surface or inside of the insulator layer within the electron emission site grows and increases. It is therefore inferred that electron emission occurs from the electron emission site because a strongly concentrated electric field is generated in the conductive minute structure when driving the electron emission device. The use of minute particles with a uniform size and shape can facilitate to form evenly electron emission sites with a uniform size and shape in the island-like regions 14 all over the device surface, resulting in formation of a very adequate pattern of electron emission.

With regard to the electron emission efficiency, highly efficient electron emission without a leak current seems to have been acquired because it is only the island-like regions 14 in the device surface which serve as the electron emission sources and conductive paths.

An effective material for the electron-supply layer 12 of the electron emission device is silicon (Si) and particularly the hydrogenated amorphous silicon (a—Si:H) in which almost of the dangling bonds of a—Si are terminated by hydrogen atoms is effective. In addition, hydrogenated amorphous silicon carbide (a—SiC:H) in which parts of Si atoms are replaced by carbon atoms (C) is also effectively used for the electron-supply layer 12. Moreover hydrogenated amorphous silicon nitride (a—SiN:H) in which parts of Si atoms are replaced by nitrogen atoms (N) may be also effectively used for the electron-supply layer 12. In addition, silicon doped with boron, aluminium, gallium, phosphorus, indium, arsenic and/or antimony may be used for the electron-supply layer 12. Instead of Si, an elemental semiconductor or a compound semiconductor of an element of a group IV, a group III–V, a group II–VI or the like, such as a germanium (Ge), germanium silicon compound (Ge—Si), silicon carbide (SiC), gallium arsenide (GaAs), indium phosphide (InP), or cadmium selenide (CdSe) or $CuInTe_2$ can be used for the electron-supply layer 12 of the electron emission device as well.

In addition, metals such as Al, Au, Ag and Cu are effective as the electron supplying material, Sc, Ti, V, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu and the like can be used for the electron-supply layer 12 as well.

Silicon oxide $SiO_x$ (wherein subscribed x represents an atomic ratio) is effective as the dielectric material of and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $ZrO_x$, $ZrN_x$, $HfO_x$, $HfN_x$, $ThO_x$, $VO_x$, $VN_x$, $NbO_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$, and the like can be used as well for the insulator layer 13.

Furthermore, metal complex oxides such $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well for the insulator layer 13. And still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer 13.

Moreover, carbon such as diamond, Fullerene ($C_{2n}$) and the like or metal carbide such as $Al_4C_3$, $B_4C$, $CaC_2$, $Cr_3C_2$, $Mo_2C$, MoC, NbC, SiC, TaC, TiC, VC, $W_2C$, WC, ZrC and the like are also effective as the dielectric material of the insulator layer 13. Fullerene ($C_{2n}$) consists of carbon atoms.

The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 other than the island-like region 14 may be 50 nm or greater preferably in ranging from 100 to 1000 nm.

Metals Pt, Au, W, Ru and Ir are effective as the material for the thin-film metal electrode 15 on the electron emission side. In addition, Be, C, Al, Si, Sc, Ti, V, Cr, Mn, Fe, Co, Ni, Cu, Zn, Ga, Y, Zr, Nb, Mo, Tc, Rh, Pd, Ag, Cd, In, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

A physical vapor deposition (PVD) and/or chemical vapor deposition (CVD) is effective for the fabrication of those layers on the substrate in the method of manufacturing an electron emission device. The PVD method includes a vacuum deposition, MBE (Molecular Beam Epitaxy), sputtering, ion beam sputtering, ionization vacuum deposition, laser ablation and the like. The CVD method includes a thermal CVD, plasma CVD and MOCVD (metal-organic chemical vapor deposition). Particularly the sputtering is effective.

Plural electron emission devices according to the invention each comprising an electron-supply layer made of Si to which B (Boron) was added were fabricated as embodiments and their characteristics were specifically examined or checked concretely.

First, plural cleaned and smooth glass substrates each being sufficiently dried were prepared as back substrates, and then an ohmic electrode of TiN was deposited at 220 nm thick on one side of each substrate by reactive sputtering with nitrogen. Then an electron-supply layer of amorphous Si to which boron is added at 0.15 atm% was deposited with a thickness of 5000 nm, by sputtering, on the ohmic electrode of every substrate, thus providing common substrates for the embodiments each carrying the electron-supply layer as so on.

For a first embodiment, as shown in FIG. 5, so-called minute-particles sprayed substrates were as prepared in which minute particles were sprayed on the electron-supply layer of the common substrate. The minute particles used in this embodiment were spherical minute particles (hereinafter simply called "spacers") having a diameter of about 1.0 μm. The material for the minute particles was $SiO_2$, and the distribution range of the particle sizes was very narrow. The minute particles were sprayed using the same known scheme as employed to spray spacers utilizing for a liquid crystal display device. There are two types of spraying, wet spraying and dry spraying, the former having been used for this embodiment.

The spherical minute particles of spacers were dispersed into ethyl alcohol and were agitated sufficiently so as not to be flocculated. This particles-dispersed solution was spin-coated on the electron-supply layer, after which ethyl alcohol was removed by drying. This allowed the spherical minute particles to be uniformly coated on the electron-supply layer. The distribution density of the minute particles adhering onto the electron-supply layer was approximately 140 particles per $mm^2$. In this way, a plurality of the minute-particles sprayed substrates were prepared as spacer substrates for the first embodiment.

For a second embodiment, as shown in FIG. 6, a plurality of minute-particles sprayed substrates each having an auxiliary insulator layer were prepared each of which has the same structure as the structure of the first embodiment, except that the auxiliary insulator layer of $SiO_2$ was formed at a 50 nm thick by sputtering immediately before the minute-particles spraying step in order to prepare a minute-particles sprayed substrate in which the minute particles were set apart from the electron-supply layer through the auxiliary insulator layer. In this way, plural substrates with spacers provided on the auxiliary insulator layer were prepared as $SiO_2$/spacer substrates.

For a third embodiment, as shown in FIG. 8, a plurality of so called block substrates were prepared, each of which has an inverse tapered block formed on the electron-supply layer of the common substrate aforementioned. A novolac-based photoresist was used as a resist for the material of the inverse tapered block, and was coated using spin coating. After the resist was coated, a desired resist pattern was formed using a photo-mask through prebaking, exposure, postbaking and developing processes. While the pattern to be formed then can have an arbitrary shape, it should be thick enough not to be completely buried in the insulator layer that would be formed later. In this example, a linear, inverse tapered block of 5000 nm in thickness and 4000 nm in height, or a columnar, inverse tapered block of 2.0 μm in diameter and 4000 nm in height was formed of the resist on the electron-supply layer. While the inverse tapered block of the resist (which will sometimes be simply called "resist" hereinafter) that was used in this example had a lateral cross-section of an inverse tapered shape, it could have an arbitrary taper angle and tapering was not essential. A plurality of substrates with a resist block provided on the electron-supply layer were prepared as block substrates in the above manner.

Next, so called device substrates carrying the electron emission devices were prepared on the basis of the substrates corresponding to the first to third embodiments in such a manner that the insulator layer of $SiO_2$ was formed at 330 nm thick on the electron-supply layer of each of the resultant substrates, by reactive sputtering with oxygen. At this time, the upper portions of the spherical minute particles and the protruding portion of the inverse tapered block were exposed through the device surface, though $SiO_2$ was sputtered on the upper surfaces of the minute particles and the inverse tapered block. Although the region near the contact area (grain boundary) where each minute particle and the inverse tapered block contacting the electron-supply layer was hidden by the overhang portion, the insulator layer was formed on that region by the sputtered gas that came from around the contact area. Around the contact area, the insulator layer was gradually thinner toward the contact area.

Next, after putting a patterned mask for the thin-film metal electrode onto the insulator layer of each device substrates, a thin film of Pt or Au is deposited at 10 nm thick thereon as thin-film metal electrodes by sputtering. In this way, the electron emission devices were prepared. At this time, the electron emission device may be formed without performing a surface treatment on the insulator layer, or the metal electrode film may be formed after subjecting the surface of the insulator layer to sputter etching. In the latter case, the sputter etching etches or modifies the boundary portion between the minute particles and the insulator (or the resist and the insulator) so that the electrode material comes around this boundary portion more effectively when the thin film of the metal electrode is formed. This would cause electron emission more effectively. The sputter etching however leaves ring-like marks on the device surface that reflect the shapes of the minute particles (or ring-like or linear marks that reflect the resist pattern).

In these first to third embodiments, each thin-film metal electrode was layered at the top surface after the sputter etching step.

As a fourth embodiment, a plurality of device substrates for the electron emission device "S" were prepared as shown in FIG. 1, so that the dispersed minute particles are removed from the minute-particles sprayed substrate of the first embodiment. Therefor each device of the fourth embodiment had only recessed island-like regions. The substrates of the fourth embodiment were prepared in the same steps as those of the first embodiment, except that the dispersed minute particles and the resist pattern were removed from the minute-particles sprayed substrate of the electron emission device with a resist of the first embodiment by ultrasonic cleaning using water, acetone, ethanol, methanol, isopropyl alcohol or the like.

As a fifth embodiment, as shown in FIG. 7, a plurality of device substrates for the electron emission device "S" were prepared removing inverse tapered block made of the resist from the block substrate of the third embodiment. Therefore, each device had only recesses and grooves in the island-like region. The substrates of the fifth embodiment were prepared in the same steps as those of the third embodiment, except that the resist pattern was removed from the block substrate of the electron emission device with a resist of the third embodiment by ultrasonic cleaning using water, acetone, ethanol, methanol, isopropyl alcohol or the like.

As a comparative example, a plurality of substrates of an electron emission device without recesses and grooves were prepared from the electron-supply layer substrate in the same procedures as those of the aforementioned examples, except that the dispersed minute particles and the resist pattern were not provided.

Meanwhile, transparent substrates were prepared by forming an ITO collector electrode and a layer of a fluorescent material in turn on the inner side of each of the transparent glass substrates 10.

The individual electron emission devices of the first to fifth embodiments and the comparative example were assembled and produced so as to hold the device substrate and the transparent substrate apart by 5 mm in parallel by spacers in such a way that the thin-film metal electrode and the collector electrode faced each other, with the clearance vacuumed to $10^{-7}$ Torr or $10^{-5}$ Pa.

The diode current Id and emission current Ie of each device were measured in the condition that the device voltage Vps of 0 to 120 V was applied between the thin-film metal electrode and the ohmic electrode of each produced device. The following Table shows the measured results. In the Table, device structure in the head line denotes, from the left side, (ohmic electrode material)/(electron-supply layer material)/(island-like region)/(insulator layer material)/ (thin-film metal material) which were laminated in the named order correspondingly to the embodiments above mentioned.

As seen from the results of the measurement, the electron emission devices having recessed island-like regions of the embodiments exhibit the emission currents. Particularly, it was apparent that the device with the lamination of TiN/Si+ B/spacer/SiO$_2$/(Pt or Au) according to the first embodiment had the emission current significantly increased from that of the comparative example.

Figure 11:
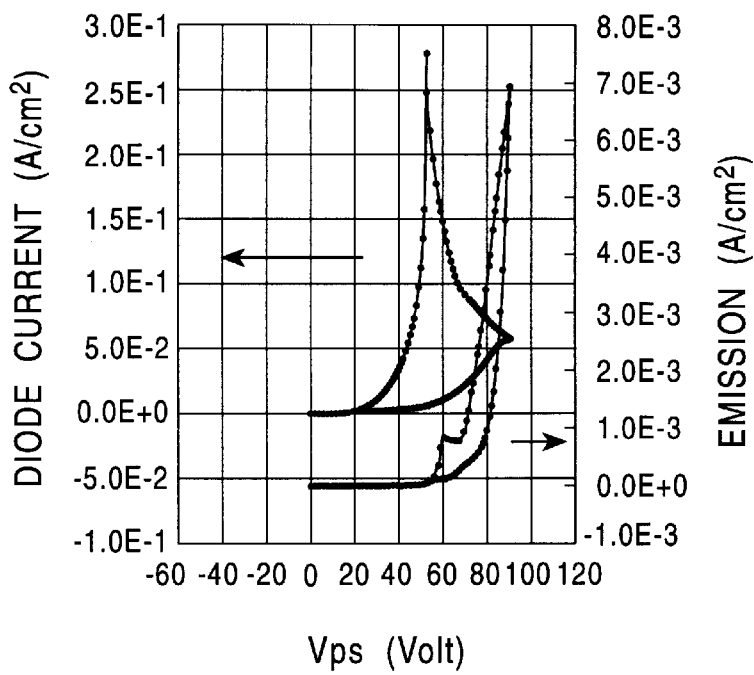
FIG. 11 is a graph showing changes in diode current Id and emission current Ie of an electron emission device having a plurality of island-like regions where the thicknesses of an insulator layer and a thin-film metal electrode gradually decrease, with respect to an applied device voltage Vps according to the present invention.
Figure 12:
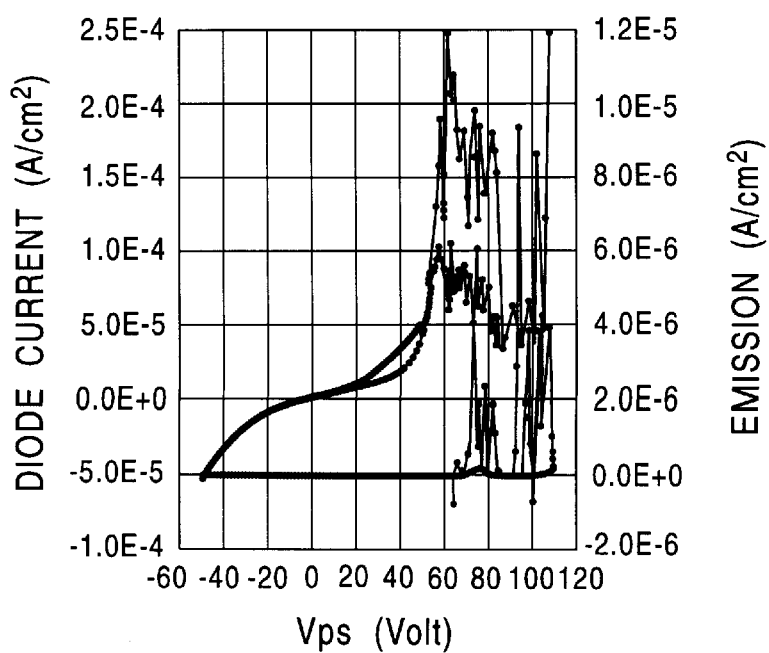
FIG. 12 is a graph showing changes in diode current Id and emission current Ie of an electron emission device as a comparative example, with respect to the applied device voltage Vps according to the present invention.

FIGS. 11 and 12 show changes in the diode current Id and the emission current Ie of the electron emission device of the first embodiment in which the Pt electrode was formed and that of the comparative example when the device voltage Vps of 0 to 90 V was applied. It is apparent from those figures that the electron emission device having the recessed island-like regions has the emission current Ie increased significantly, higher by two digits than that of the comparative example. The maximum emission current of the first embodiment was $6.9 \times 10^{-3}$ A/cm$^2$ in contrast to $1.2 \times 10^{-5}$ A/cm$^2$ of the comparative example. As there are approximately 140 recessed island-like regions per mm$^2$, the average electron emission from one recessed island-like region is calculated to be $5.0 \times 10^{-7}$ A. It is also clear that the electron emission device that has recessed island-like regions provides a stable emission current Ie and diode current Id which have very slight variations, as compared with those of the comparative example.

Further, devices with insulator layers, whose general thicknesses were 50 nm or thicker but whose thicknesses varied within a range of 50 nm to 1000 nm, were prepared under the above conditions of the first embodiment, and the variable electron emission efficiency, {Ie/(Ie+Id)×100}(%), with respect to those thicknesses of the insulator layers was measured as a voltage of 200 V or lower was applied to the devices. The results showed that the devices having the insulator layers with those specified thicknesses demonstrated the electron emission efficiency of 0.1% or greater.

The electron emission device whose electron-supply layer contains Si alone and no B added also demonstrated the same effects as those examples.

Figure 13:
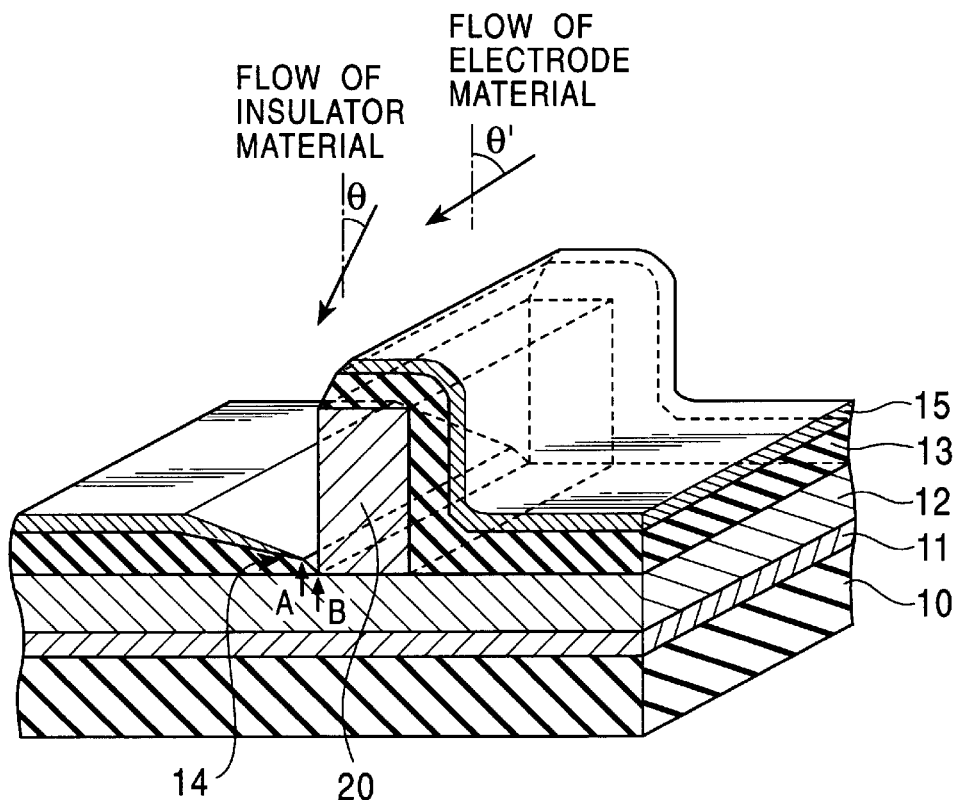
FIGS. 13 and 14 are enlarged perspective views each illustrating a part of a different electron emission device according to the present invention respectively.

Although the foregoing description of the examples has been given with reference to an electron emission device which has a plurality of recessed or grooved island-like regions in the insulator layer and the thin-film metal electrode in such a way that the thicknesses of the layer and metal electrode gradually decrease toward the center, the thicknesses of the layer and metal electrode may gradually decrease away from the center. For example, as a further example, each island-like region 14 where the thicknesses of the insulator layer 13 and the thin-film metal electrode 15 gradually decrease toward a shielding partition 20a may be formed on one side wall of the associated groove or recess, as shown in FIG. 13.

TABLE

| Embodiment | Device structure | Vps (V) | Diode curt. Id(A/cm$^2$) | Emission curt. Ie(A/cm$^2$) | Eff. (%) |
| --- | --- | --- | --- | --- | --- |
| 1st | TiN/Si + B/spacer/SiO$_2$/Pt | 90 | $5.90 \times 10^{-2}$ | $6.94 \times 10^{-3}$ | 10.52 |
|  | TiN/Si + B/spacer/SiO$_2$/Au | 90 | $9.28 \times 10^{-2}$ | $2.12 \times 10^{-2}$ | 18.60 |
| 2nd | TiN/Si + B/SiO$_2$(50 nm)/spacer/SiO$_2$/Pt | 90 | $4.00 \times 10^{-2}$ | $1.11 \times 10^{-3}$ | 2.71 |
| 3rd | TiN/Si + B/resist/SiO$_2$/Pt | 65 | $4.00 \times 10^{-1}$ | $5.72 \times 10^{-3}$ | 1.41 |
| 4th | TiN/Si + B/spacer(removed)/SiO$_2$/Pt | 90 | $3.64 \times 10^{-2}$ | $5.34 \times 10^{-3}$ | 12.80 |
| 5th | TiN/Si + B/resist(removed)/SiO$_2$/Pt | 77 | $1.99 \times 10^{-2}$ | $5.61 \times 10^{-3}$ | 21.99 |
| Comp. | TiN/Si + B/SiO$_2$/Pt | 108 | $6.79 \times 10^{-5}$ | $1.19 \times 10^{-5}$ | 14.91 |

In the Table, the spacer denotes spherical particles made of an insulator, and the resist denotes inverse tapered blocks made of a novolac based photoresist.

The grooved or recessed island-like regions 14 shown in FIG. 13 can be formed as follows. First, like the linear, tapered block 21a shown in FIG. 8, the shielding partition 20a is formed of a resist on the substrate 10 on which the ohmic electrode 11 and the electron-supply layer 12 are formed in order. Then, the insulator layer 13 is formed by sputtering or the like. At the time of sputtering the insulator layer, the surface of the electron-supply layer 12 on the substrate 10 is inclined with respect to the direction of the flow of the sputtered insulator material, so that the insulator layer 13 will have a portion where a smaller amount of the insulator material is deposited on one side of the shielding partition 20a or where the thickness of the insulator layer gradually decreases toward the shielding partition 20a. Next, the surface of the insulator layer 13 on the substrate 10 is inclined with respect to the direction of the flow of the sputtered material for the thin-film metal electrode, so that the thin-film metal electrode will have a portion where a smaller amount of the material of the thin-film metal electrode is deposited on one side of the shielding partition 20a or where the thickness of the thin-film metal electrode gradually decreases toward the shielding partition 20a. If the angle of the substrate 10 in the inclined sputtering of the insulator layer 13 and the thin-film metal electrode 15 is set in the sputtering system in such a manner that the angle θ' of the flow of the sputtered material of the thin-film metal electrode 15 to the substrate becomes greater than the angle θ of the flow of the sputtered material of the insulator layer 13 to the substrate, each island-like region 14 can have a structure where the thin-film metal electrode 15 ends at the edge "An" on the insulator layer 13. The insulator layer 13 in the island-like region 14 ends at the edge "B" on the electron-supply layer 12. The shielding partition 20a and the deposition thereon may be removed by etching, thereby exposing the electron-supply layer 12.

Figure 14:
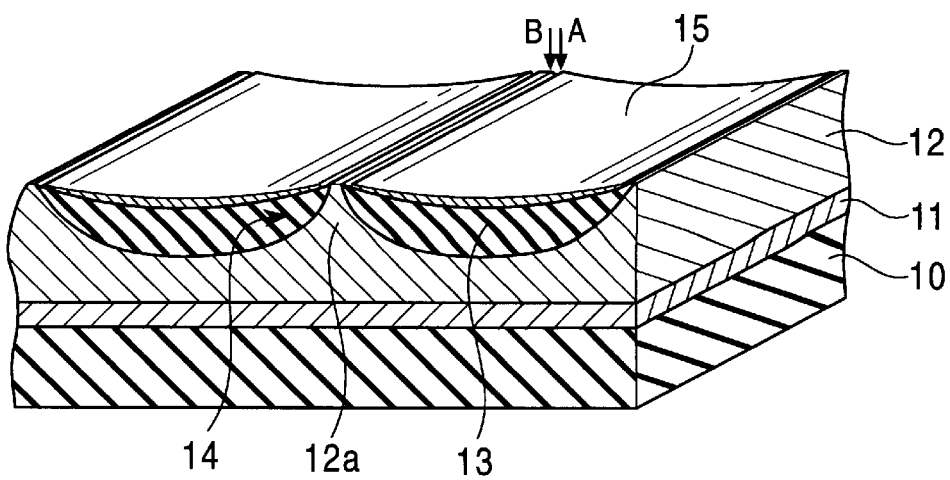

Although the island-like regions are formed as recesses in the above-described examples, the island-like regions may be designed as flat or convex portions in such a fashion that the thicknesses of the insulator layer and the thin-film metal electrode gradually decrease. For example, as a still further example, flat or convex island-like regions 14 may be formed in such a way that the thicknesses of the insulator layer 13 and the thin-film metal electrode 15 gradually decrease toward the top of a mountain portion 12a of the electron-supply layer 12, as shown in FIG. 14. Those flat or convex island-like regions 14 can be formed by photolithography and etching, etc. The mountain portion 12a of the electron-supply layer 12 may be continuous as a mountain chain or cordillera or sierra, and alternatively may be formed as a series of independent recesses or protrusions. In this case too, the thin-film metal electrode 15 in each island-like region 14 ends at the edge "A" on the insulator layer 13 while the insulator layer 13 ends at the edge "B" on the electron-supply layer 12. The top of the mountain portion 12a of the electron-supply layer 12 may be covered with the insulator layer 13 in such a way that the electron-supply layer 12 is completely covered.

Figure 15:
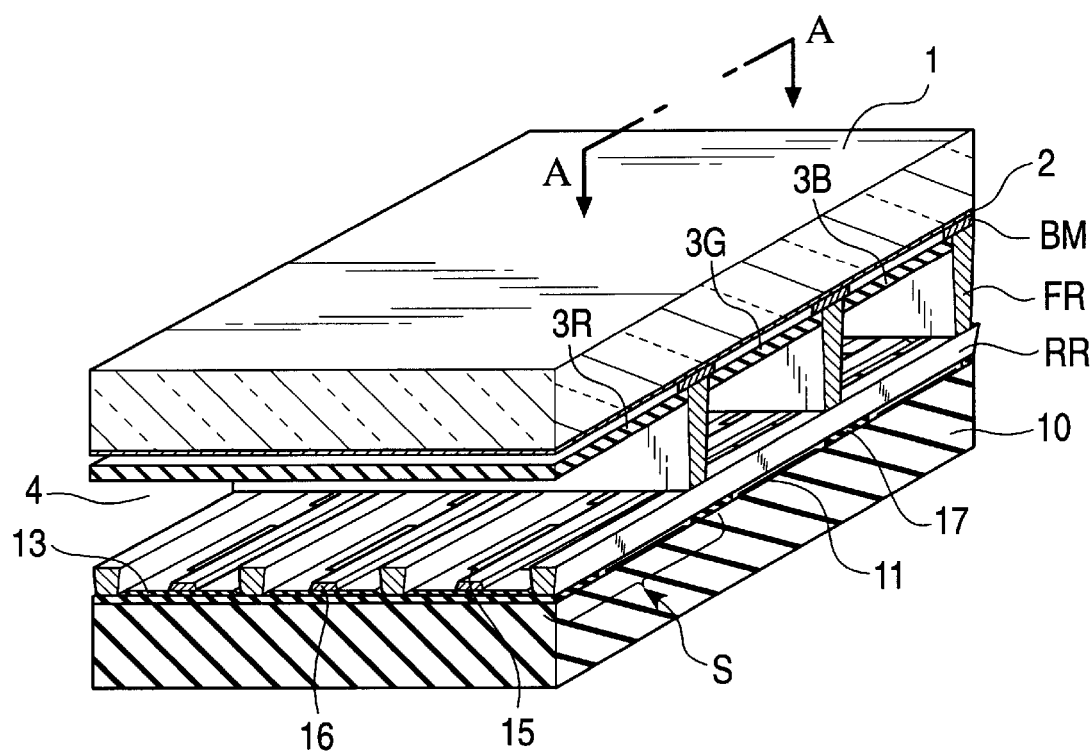
FIG. 15 is a schematic partial perspective view illustrating an electron emission display device according to an embodiment of the present invention.

FIG. 15 illustrates an embodiment of an electron emission display device comprising ramparts or ribs formed therein and a plurality of electron emission devices arranged in a matrix form as an image display array. The illustrated electron emission display device comprises a front transparent substrate 1 made of glass or the like and a back substrate 10 carrying the electron emission devices and supporting the front substrate. Rear ramparts or ribs RRs formed on the back substrate 10 abut to front ramparts or ribs FRs formed on the front substrate 1 at the top surfaces thereof so that both the substrates are placed apart from and parallel to each other with a vacuum space 4 interposed therebetween.

A plurality of ohmic electrodes 11 extending in parallel with each other are formed on the inner surface of the back substrate 10 proximately to the vacuum space 4. The ohmic electrodes 11 are grouped into sets of three corresponding to R (red), G (green), B (blue) color signals to provide a color display panel, and are applied with predetermined signals, respectively. On the ohmic electrodes 11, a plurality of electron emission devices "S" are formed and arranged in a matrix form. On portions of thin-film metal electrodes of adjacent devices, a plurality of bus electrodes 16 extending perpendicular to the ohmic electrodes and in parallel with each other are routed to electrically connect the thin-film metal electrodes. An intersection of an ohmic electrode 11 and a bus electrode 16 corresponds to an electron emission device "S". Therefore, a passive matrix scheme or an active matrix scheme may be applied as a driving scheme for the display apparatus of the present invention.

Figure 16:
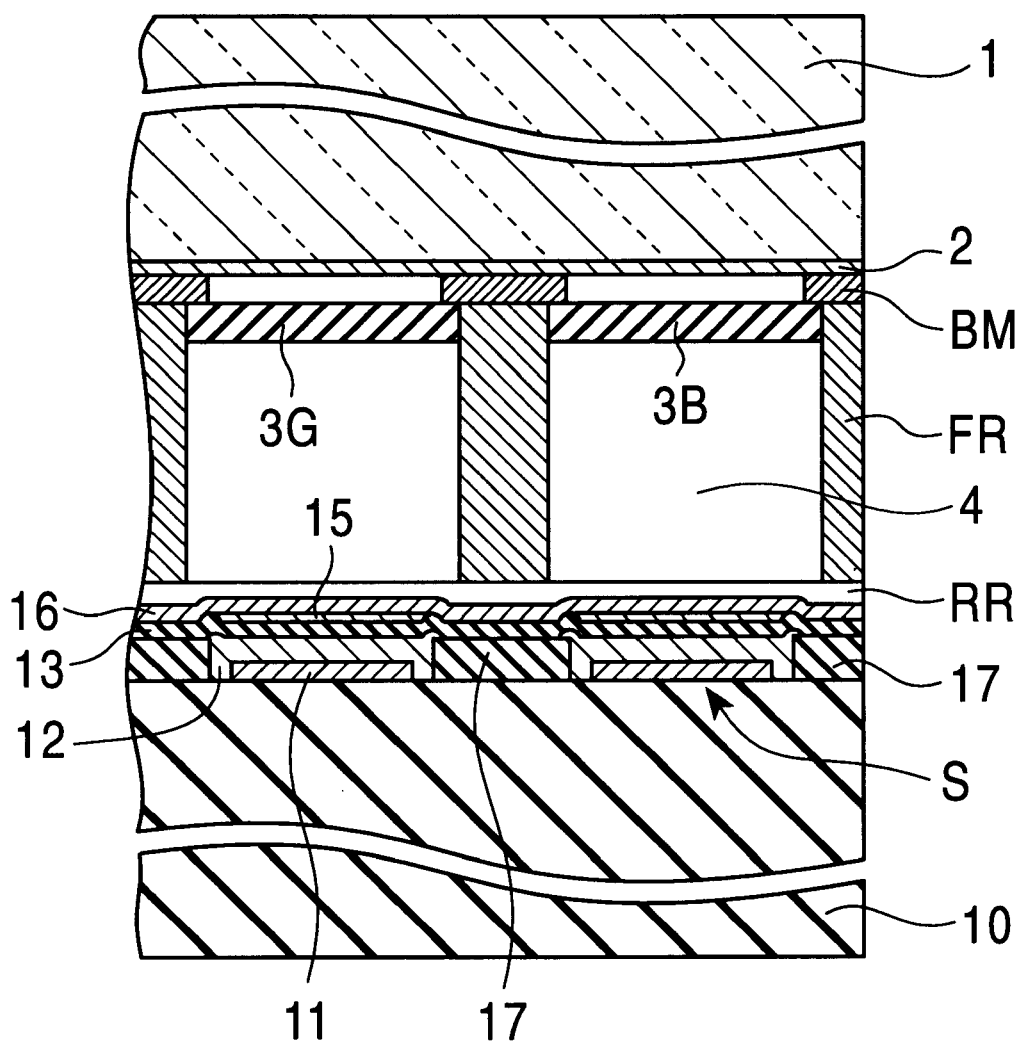
FIG. 16 is a schematic partial enlarged cross-sectional view of the electron emission display device according to the present invention, taken with a line AA in FIG. 15.

As illustrated in FIG. 16, each electron emission device "S" comprises an electron-supply layer 12, an insulator layer 13 and a thin-film metal electrode 15 formed in this order on the ohmic electrode 11. The insulator layer 13 and a thin-film metal electrode 15 have plural island-like regions (but not shown) in which the thicknesses of island-like portions of the insulator layer and the thin-film metal electrode gradually decrease in a direction that their interface extends as shown in at least one of FIGS. 1, 5, 6 to 10, 13 and 14. The thin-film metal electrode 15 faces the vacuum space 4.

In particular, an insulative support member 17 is formed to surround each of the electron emission devices "S" and to define a plurality of electron emitting regions. The insulative support member 17 supports the bus electrodes 16, and prevents line failures. More specifically, as illustrated in FIG. 16, the insulative support member 17 or a material having a large electric resistance is previously formed in peripheral portions except for the electron emission devices in a thickness similar to a final thickness of the electron emission devices when formed in subsequent steps.

Further, in this embodiment, the rear ribs RRs associated with the back substrate 10 is formed on the insulative support member 17 so as to protrude into the vacuum space 4 from the back substrate 10. The ribs RRs are positioned at predetermined intervals. While in FIG. 15, the ribs RRs are formed between respective electron emission devices "S", the ribs RRs may be formed at larger intervals, for example, every two or three electron emission devices "S". Also, while in FIG. 15, the ribs RRs are continuously formed in a direction substantially perpendicular to the ohmic electrodes 11, the ribs RRs may be intermittently formed so as to leave upper areas including portions abutting to the front ramparts FRs associated with the front substrate 1, but not illustrated.

Preferably, each of the ribs RRs has its top surface area larger than the bottom surface area which is in contact with the back substrate 10. In other words, each of the ribs RR is preferably formed to have an overhung portion on its top which protrudes in a direction substantially parallel with the back substrate 10.

Further, while in FIG. 15, the bus electrodes 16 disposed on the thin-film metal electrodes 15 of the back substrate 10 are formed in a simple linear shape, the bus electrodes 16 are preferably formed, instead of the linear shape, so as to have a width between the thin-film metal electrodes 15 of the electron emission devices larger than that on the thin-film metal electrodes. In other words, the bus electrodes 16 are preferably formed to be wider between the electron emission devices than on the devices. In this way, the resistance of the bus electrodes can be reduced.

The material for the ohmic electrodes 11 is Au, Pt, Al, W or the like which is generally used for the wires in an IC, and alternatively the ohmic electrodes may be formed as a three layer structure composed of chromium, nickel and chromium layers. Moreover, an alloy of Al—Nd, Al—Mo, or Ti—N may be used for the ohmic electrode material. The ohmic electrodes 11 has a uniform thickness for supplying substantially the same current to the individual devices. In addition, an auxiliary insulator layer comprised of an insulator such as $SiO_2$, $SiN_x$, $Al_{23}$ or AlN may be provided between the back substrate 10 and the ohmic electrode 11, but not shown in FIG. 15. The auxiliary insulator layer serves to prevent an adverse influence of the back substrate 10 on the device (such as elution of an impurity such as an alkaline component or a roughened substrate surface).

From the principle of electron emission, it is better that the material for the thin-film metal electrode 15 has a lower work function$\phi$ and is thinner. To increase the electron emission efficiency, the material for the thin-film metal electrode 15 should be a metal of the group I or group II in the periodic table; for example, Cs, Rb, Li, Sr, Mg, Ba, Ca and the like are effective and alloys of those elements may be used as well. To make the thin-film metal electrode 15 very thin, the material for the thin-film metal electrode 15 should be chemically stable with a high conductivity; for example, single substances of Au, Pt, Lu, Ag, Cu and Ir or an alloy thereof or a multi-layer thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 $\mu$m. If the electrical resistance of material of the thin-film metal electrode is allowable for the bus electrodes, such electrode material may be used for the bus electrodes.

On the other hand, transparent collector electrodes 2 made of ITO to which a high voltage is applied are integrally formed on the inner surface (surface opposing to the back substrate 10) of the optically transparent front substrate 1 made of transparent glass and serving as a display surface. In case that a black stripe mask or back metal layer is provided on the front substrate 1, such a conductive layer may be serve as a collector electrode instead of the ITO transparent collector electrode.

On the collector electrodes 2, a plurality of front ribs (second insulative rib) FRs are formed in parallel with the ohmic electrodes 11. On the collector electrodes 2 between the extending front ribs, fluorescent material layers 3R, 3G, 3B made of fluorescent materials corresponding to R, G, B are formed, respectively, in opposition to the vacuum space 4. In this way, the front ribs (second insulative rib) FRs are provided at boundaries of the respective fluorescent materials to maintain a constant distance (for example, 1 mm) between the back substrate and the front substrate. Since the front ribs (second insulative rib) FRs are disposed on the front substrate 1 in a direction orthogonal to the rear ribs (first insulative rib) RRs disposed on the back substrate 10, it is ensured that the front substrate are definitely colored by the fluorescent materials in R, G, B corresponding to the three primary colors of light.

As described above, the electron emission display device according to this embodiment has an image display array composed of a plurality of light emitting pixels which are arranged in a matrix form and each of which includes red (R), green (G) and blue (B) light emitting elements. Of course, a monochrome display panel may be formed by replacing all the RGB light emitting elements with monochrome light emitting elements.

Figure 17:
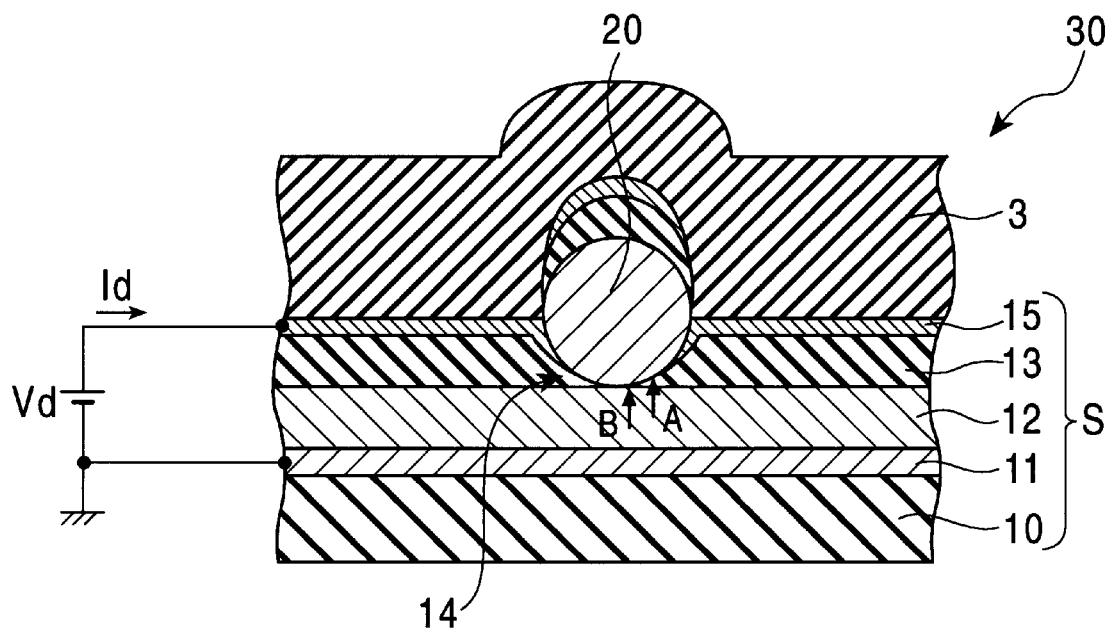
FIGS. 17 and 18 are enlarged cross-sectional views each illustrating a part of a further electron emission device according to the present invention respectively.

FIG. 17 shows one electron emission light-emitting device 30 of another embodiment according to the present invention, which is constructed in a similar manner of the above mentioned embodiment by forming an ohmic electrode 11 on a back glass substrate 10, forming an electron-supply layer 12 made of a semiconductor material on the electrode 11, spraying a plurality of minute particles 20 onto the electron-supply layer 12, and depositing an insulator layer 13 on the layer 12 and forming a thin-film metal electrode 15 on the layer 13 to form plural island-like regions 14. Instead of the fabrication of minute particles 20 on the electron-supply layer 12, the line-or wall-shaped inverse tapered blocks 21a as shown in FIG. 8 or the columnar inverse tapered blocks 21b as shown in FIG. 10 may be formed as mentioned above.

Figure 18:
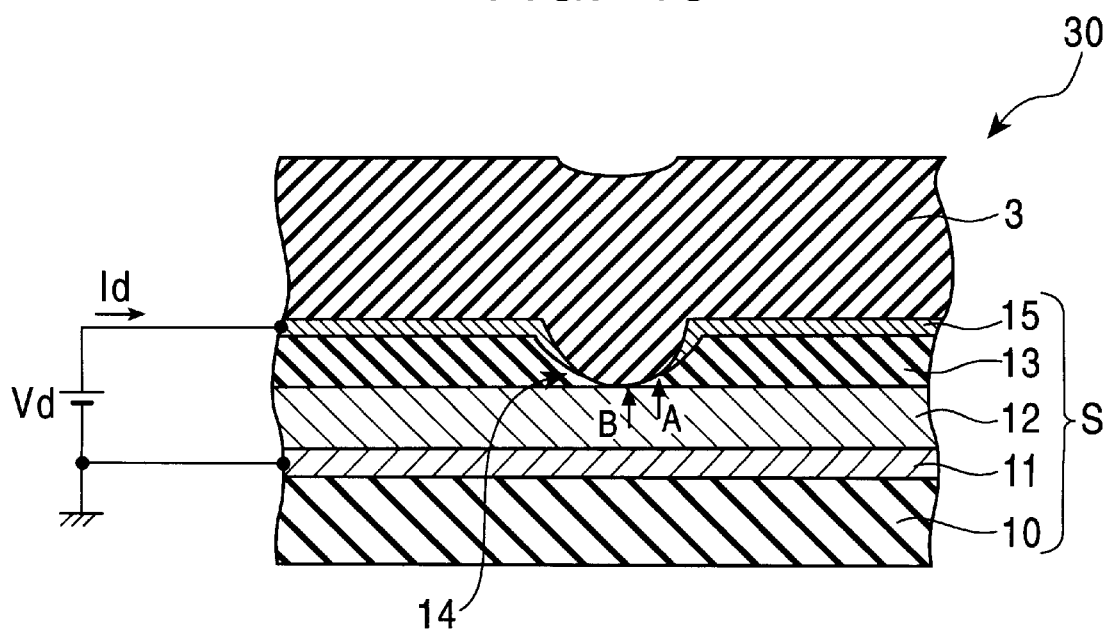

The electron emission light-emitting device comprises a fluorescent material layer 3 formed on the plural island-like regions 14 and the thin-film metal electrode 15 of the electron emission device "S". The fluorescent layer 3 directly accepts the electrons from the plural island-like regions 14 of the electron emission device, thereby emitting light. In addition, FIG. 18 shows another electron emission light-emitting device 30 according to the present invention, which is the same except the minute particles 20 of the above mentioned embodiment are removed. The electron emission light-emitting device also involves a derivative comprising the electron emission device shown in FIG. 14 and a fluorescent material layer 3 formed on the plural flat or convex island-like regions 14.

The preparing method of fluorescent material layer 3 is a spin-coating in that the thin-film metal electrode 15 is coated with a fluorescent material capable of emitting a desired color light in a fluid form. The preparing method of fluorescent material layer 3 is not limited.

In addition, a light-permeable substrate 1 made of glass may be provided as a front substrate with the electron emission light-emitting device to protect the devices formed on the back substrate. On the inner surface of the front substrate, at lest one light-permeable collector electrode may be formed. The transparent collector electrode traps and collects the electrons passing through the fluorescent material layer. Both the from and back substrates are supported and sealed to face each other with an adhesive material surrounded by a spacer in a manner that the electron emission light-emitting devices are interposed therebetween.

According to the electron emission light-emitting device of the invention with the above structure, since the fluorescent material layer is formed on the thin-film metal electrode of the electron emission device, no extra electric power is required for accelerating electrons, so that the simple driving circuit may be used in the display device. Further since there is no vacuum space between the fluorescent material layer and the thin-film metal electrode, a super thin flat panel display device is obtained by utilizing the electron emission light-emitting device of the invention and such a panel display device has a good view from outside since there is no necessity of extra spacer for a vacuum space.

What is claimed is:

1. An electron emission device comprising:
   an electron-supply layer made of a semiconductor material, a metal compound or metal;
   an insulator layer formed on the electron-supply layer; and
   a thin-film metal electrode formed on the insulator layer, characterized in that the insulator layer and the thin-film metal have a plurality of island-like regions where thicknesses of both the insulator layer and the thin-film metal electrode gradually decrease.

2. An electron emission device according to claim 1, wherein said island-like regions are electron emission sites.

3. An electron emission device according to claim 1, wherein said insulator layer is made of dielectric and has a film thickness of 50 nm or greater.

4. An electron emission device according to claim 1, wherein the thin-film metal electrode is terminated on the insulator layer in each of the island-like regions.

5. An electron emission device according to claim 1, wherein the insulator layer is terminated on the electron-supply layer in each of the island-like regions.

6. An electron emission device according to claim 1, wherein each of the island-like regions is a recess formed in a flat surface of the thin-film metal electrode.

7. An electron emission device according to claim 1, wherein the insulator layer and the thin-film metal are formed by a physical vapor deposition and/or chemical vapor deposition.

8. An electron emission device according to claim 1, wherein a minute particle is provided in each of the island-like regions.

9. An electron emission device according to claim 1, wherein an inverse tapered block is provided in each of the island-like regions.

10. A method of manufacturing an electron emission device having a plurality of island-like regions where thicknesses of an insulator layer and a thin-film metal electrode gradually decrease, said method comprising the steps of:

forming an electron-supply layer on a substrate;

spraying a plurality of minute particles onto the electron-supply layer;

depositing an insulator material on the electron-supply layer and the minute particles, thereby forming a thin insulator layer; and forming a thin-film metal electrode on the insulator layer and the minute particles, thereby forming island-like regions around a contact surface under the minute particles.

11. A method according to claim 10 further comprising a step of applying a voltage across the electron-supply layer and the thin-film metal electrode for growth of conductive paths after the thin-metal electrode forming step.

12. A method according to claim 10 further comprising a step of removing the minute particles from the island-like regions after the thin-metal electrode forming step.

13. A method according to claim 12 further comprising a step of applying a voltage across the electron-supply layer and the thin-film metal electrode for growth of conductive paths after the minute particle removing step.

14. A method of manufacturing an electron emission device having a plurality of island-like regions where thicknesses of an insulator layer and a thin-film metal electrode gradually decrease, said method comprising the steps of:

forming an electron-supply layer on a substrate;

forming electrically insulative inverse tapered blocks each protruding in a direction normal to the substrate and each having an overhang portion, at an upper portion thereof, protruding in a direction parallel to the substrate;

depositing an insulator on the electron-supply layer, thereby forming a thin insulator layer; and forming a thin-film metal electrode on the insulator layer, thereby forming island-like regions around a contact surface under the inverse tapered blocks.

15. A method according to claim 14 further comprising a step of applying a voltage across the electron-supply layer and the thin-film metal electrode for growth of conductive paths after the thin-metal electrode forming step.

16. A method according to claim 14 further comprising a lift-off step of removing the inverse tapered blocks from the island-like regions after the thin-metal electrode forming step.

17. A method according to claim 16 further comprising a step of applying a voltage across the electron-supply layer and the thin-film metal electrode for growth of conductive paths after the lift-off step.

18. A method according to claim 14, wherein said block forming step includes steps of forming an inverse tapered block material layer on said substrate, forming a resist mask on said inverse tapered block material layer by photolithography for exposing part of at least said electron-supply layer, and carving said inverse tapered blocks having said overhang portions by dry etching or wet etching.

19. An electron emission display device comprising:

a pair of a first substrate and an optically transparent second substrate opposing to each other with a vacuum space interposed therebetween;

a plurality of electron emission devices formed on said first substrate, each of which including an electron-supply layer made of a semiconductor material, a metal compound or metal formed on ohmic electrodes formed on said first substrate, an insulator layer formed on said electron-supply layer, and a thin-film metal electrode formed on said insulator layer and facing the vacuum space, wherein the insulator layer and the thin-film metal have a plurality of island-like regions where thicknesses of both the insulator layer and the thin-film metal electrode gradually decrease;

a collector electrode formed on said second substrate; and a fluorescent material layer formed on said collector electrode and facing the vacuum space.

20. An electron emission display device according to claim 19, wherein said insulator layer is made of dielectric and has a film thickness of 50 nm or greater.

21. An electron emission display device according to claim 19, wherein the thin-film metal electrode is terminated on the insulator layer in each of the island-like regions.

22. An electron emission display device according to claim 19, wherein the insulator layer is terminated on the electron-supply layer in each of the island-like regions.

23. An electron emission display device according to claim 19, wherein each of the island-like regions is a recess formed in a flat surface of the thin-film metal electrode.

24. An electron emission display device according to claim 19, wherein the insulator layer and the thin-film metal are formed by a physical vapor deposition and/or chemical vapor deposition.

25. An electron emission display device according to claim 19, wherein the display device further comprises plural insulative support members formed on said first substrate and disposed between adjacent ones of said electron emission devices so as to enclose the electron emission devices for partitioning them, wherein the distance from said first substrate to the surfaces of said insulative support members proximate to said vacuum space is substantially equal to the distance from said first substrate to the surface of said thin-film metal electrodes proximate to said vacuum space.

26. An electron emission display device according to claim 19, wherein the display device further comprises a plurality of bus electrodes, each of which is arranged in a stripe form to electrically connect adjacent ones of said thin-film metal electrodes, wherein said ohmic electrodes and said electrodes are stripe-like electrodes and arranged to extend perpendicular to each other.

27. An electron emission display device according to claim 19, wherein said first substrate includes a plurality of first insulative ramparts, each of which disposed between said electron emission devices and protruding into said vacuum space, whereas said second substrate includes a plurality of second ramparts each of which protrudes into said vacuum space to abut to said first ramparts.

* * * * *